United States Patent

[11] 3,538,881

| [72] | Inventor | Charles A. Fenwick |
| | | Cedar Rapids, Iowa |
| [21] | Appl. No. | 820,402 |
| [22] | Filed | April 30, 1969 |
| [45] | Patented | Nov. 10, 1970 |
| [73] | Assignee | Collins Radio Company |
| | | Cedar Rapids, Iowa |
| | | a corporation of Iowa |

[54] HORIZONTAL SITUATION INDICATOR WITH NONLINEAR COMPASS CARD
8 Claims, 5 Drawing Figs.

[52] U.S. Cl. .................................................. 116/129;
33/224; 73/178; 235/61
[51] Int. Cl. .................................................. G09f 9/00
[50] Field of Search .................................................. 116/124,
129, 136.5; 73/178; 33/137L, 224; 74/Consulted;
235/61

[56] References Cited
UNITED STATES PATENTS

| 2,526,921 | 10/1950 | Ahblom.............. | 33/224 |
| 2,883,958 | 4/1959 | DuBois.............. | 116/129 |
| 3,084,660 | 4/1963 | Suzuki.............. | 116/129 |
| 3,330,478 | 7/1967 | Berry.............. | 235/61 |

FOREIGN PATENTS

| 820,412 | 8/1937 | France .................. | 33/224 |

*Primary Examiner*—Louis J. Capozi
*Attorneys*—Richard W. Anderson and Robert J. Crawford ABSTRACT: A horizontal situation indicator type of instrument, or other type of instrument employing a compass ring, is provided with a built-in magnification feature as concerns the area of readout in the vicinity of the reference lubber line. A magnification of the readout in the vicinity of the lubber line is achieved while maintaining pictorial validity as concerns the overall integrated display by displacing a normally centered aircraft reference symbol from the center toward the bottom of the display with the compass card divisions being displayed as projected points from the angular division points of a phantom compass card whose center is at the lower aircraft symbol location and whose radius is equal to the distance between the lower center point and the lubber line. An implementation is described which embodies a stretchable cylindrical section as the compass scale carrying member with means for driving the ring and controlling the stretch of the ring in a manner to implement the geometry imposed by the display technique.

Patented Nov. 10, 1970

INVENTOR.
CHARLES A. FENWICK

BY *Richard W. Anderson*

AGENT

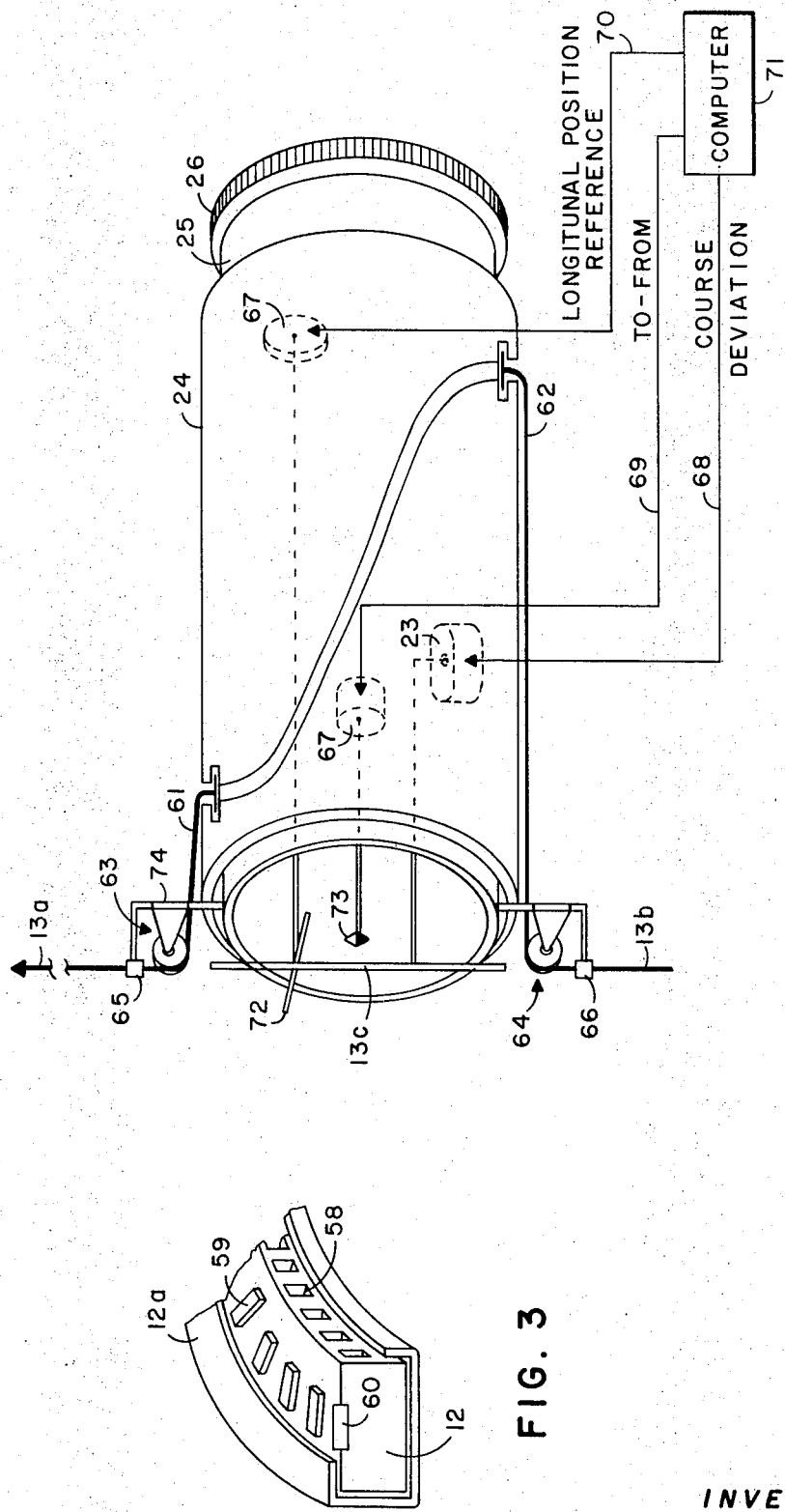

INVENTOR.
CHARLES A. FENWICK
BY Richard W Anderson
AGENT

HORIZONTAL SITUATION INDICATOR WITH NONLINEAR COMPASS CARD

This invention relates generally to aircraft instrumentation and more particularly to an improved aircraft instrument of the type presenting an integrated horizontal situation display. Instruments of the type are known in the art and generally referred to as horizontal situation indicators. One such type of indicator is depicted in U.S. Pat. No. D 170,184 to Schweighofer et al., assignors to the assignee of the present invention.

Horizontal situation indicators are widely employed in modern-day aircraft and present to the pilot a picturelike view, as the name infers, of the horizontal situation; that is, the geographical orientation of the aircraft with respect to a compass rose and with respect to a selected course; and including an indication of lateral and angular deviation of the aircraft with respect to a selected course. A pictorial representation of the orientation of an aircraft with respect to a maplike display is presented much the same as the pilot would "see" should he be located over his aircraft and be viewing his aircraft with respect to a ground map.

Since horizontal situation indicators include as a basic portion thereof a compass rose or compass ring, the accuracy with which a particular heading may be read or followed by the pilot is dependent on the scale factor which in turn relates to the diameter of the compass ring or compass card. Instrument panel space in aircraft is at a premium and the diameter of any particular instrument is ofttimes limited by available space and thus the readout accuracy may likewise have to suffer accordingly. Current standardized compass cards employed in instrumentation —a 2.78 inch diameter card for commercial usage and 3.12 inch diameter card for military usage —are considered by some users to be inadequate for reading headings for ground control approach operations in that the scale factor is necessarily insufficient for fine settings and fine readouts. The primary object of the present invention, therefore, is the provision of a horizontal situation indicator type of instrument, or other type of instrument employing a compass ring, wherein a built-in magnification feature is incorporated as concerns the area of readout in the vicinity of the reference lubber line.

A further object of the present invention is the provision of an aircraft instrument employing a compass card and further incorporating other indicia which collectively represent a maplike horizontal pictorial situation readout in which a magnification of the compass card readout in the vicinity of the lubber line is realized while maintaining pictorial validity as concerns the overall display.

The present invention features the provision of an integrated instrument display of the type employing a compass card and other horizontal situation depicting indicia wherein a magnification of the compass readout in the vicinity of the lubber line in the vicinity of a two-to-one ratio is achieved while maintaining pictorial validity as concerns the overall integrated display.

The present invention is featured in embodying the compass card or compass ring as a stretchable ring member supported on an appropriate drive mechanism such that the area of the ring in the vicinity of the lubber line presents a magnified scale factor while the overall compass readings maintain pictorial validity as concerns the remainder of the display.

The present invention is based upon the employment of a technique wherein an aircraft reference symbol normally placed in the center of the viewing circle, and thus concentrically with the standard linear compass card, is displaced from the center toward the bottom of the display, and the location of the compass card divisions are projected points from the angular division points of a phantom compass card whose center is at the lower aircraft symbol location and whose radius is equal to the distance between the lower center point and the lubber line.

These and other objects and features of the present invention will become apparent upon reading the following description in conjunction with the accompanying drawings in which FIG. 1 is a face view of a new instrument in accordance with the present invention;

FIG. 3 illustrates a mechanical detail of the mounting and driving arrangement as concerns the compass ring of the present invention;

FIG. 5 illustrates a mechanical subassembly of the type of instrument in FIG. 4.

Figure 1:
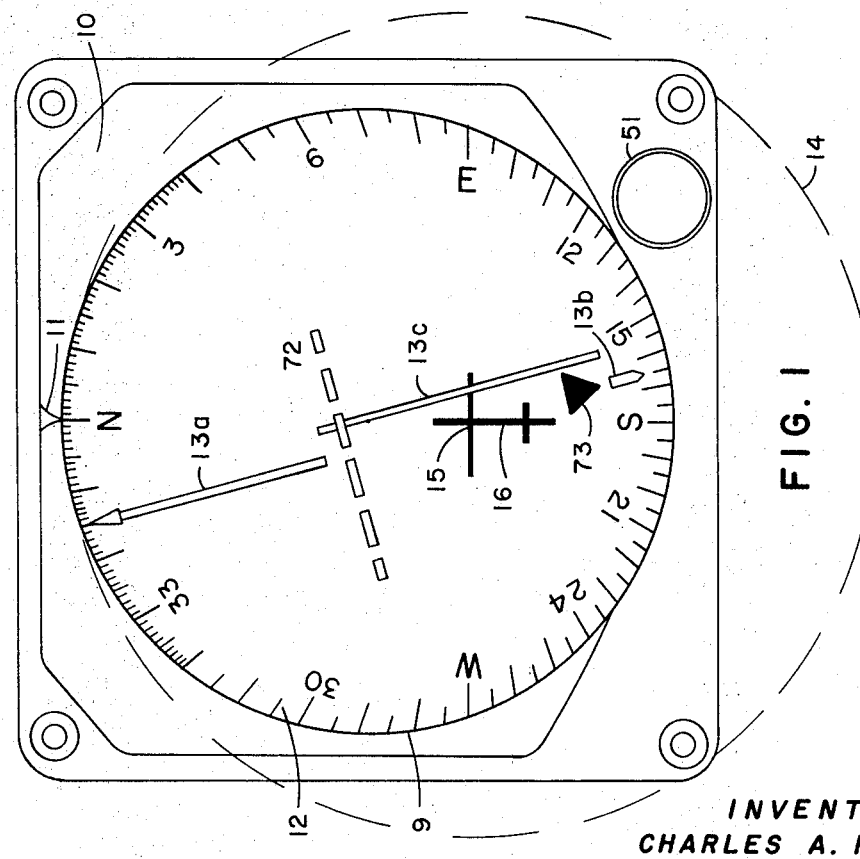

FIG. 1 illustrates the display concept as viewed by an observer. A front plate member 10 is formed with a viewing window 9 through which a compass card 12 is observable. The card 12 carries indicia indicating degrees which may be read against the lubber line reference index 11. In conventional instrumentation of this general type, the indicia on the compass card 12 are uniform angular subdivisions placed about the periphery ring 12. A fixed aircraft reference symbol 16 indicates to the observer the position of his aircraft with respect to the geography of his horizontal flight situation. A pointer member comprised of three portions 13a, 13b and 13c indicates a selected course to be flown by its angular position with respect to the compass ring 12 and is adjustable by the pilot. A center portion 13c of the course "arrow" is displaceable transverse of the axis of the arrow and with respect to the aircraft reference 16 to indicate the deviation of the aircraft from a selected course as defined by a ground reference station. A further transverse reference bar 72 may be incorporated to indicate aircraft longitudinal deviation from a selected reference. A further indicator 73 in the form of an arrowhead may be incorporated to indicate whether aircraft flight is to or from the ground reference station. This type of instrument, in terms of the above general description, is widely used as a standard pilot aid.

The improvement in accordance with the present invention, as indicated in FIG. 1, incorporates a radical variation from standard instrumentation in that the scale factor of the compass card 12 in the vicinity of the lubber line 11 is expanded. By observation it is apparent that the scale factor in the vicinity of the lubber line 11 is noticeably increased over that at the bottom of the instrument. This presentation is arrived at by assuming a phantom center of rotation of a normal linear compass card to be at a point 15 displaced beneath the center of the viewing circle 9. Point 15 is the center of a phantom circle 14 with radius equal to the distance between the displaced center 15 and the lubber line 11. The angular indications on the compass card or ring 12 are seen to be projections of corresponding angular subdivisions of the larger phantom circle 14 upon the viewing circle 9. This imposes a geometry whereby the subdivisions in the vicinity of the lubber line 11 are expanded as compared to those at the bottom of the instrument. In the instrument face depicted in FIG. 1, an approximate two-fold increase in scale factor is realized in the region where greatest reading accuracy is required. Obviously, additional scale expansion in the vicinity of the lubber line could be achieved by utilizing a larger phantom circle 14. However, a diameter ratio, as concerns the viewing and phantom circles, of approximately 4.5 to 6 appears to be an optimum choice among the trade-offs of apparent pictorial distortion and quantitative readability of new course selections.

The course selection indicator 13a, 13b, 13c must be embodied such that the extremes; that is, the arrow and the butt ends respectively, maintain an adjacent relationship with respect to the compass reference marks regardless of the angular position of the course indicator. Since the geometry employed to obtain a magnification of the compass readout in the vicinity of the lubber line is based upon a circle whose center is lower than the actual center of the viewing circle, it is apparent that the lengths of the arrow and butt ends of the course selector indicator must vary as a function of the angular position of the arrow assembly with respect to the lubber line. The central portion 13c of the course selector is displaceable transverse of the selector axis to indicate off-course deviation and remains a fixed length which is symmetrically oriented with respect to the aircraft reference symbol 16.

The above described geometry concerning the indicated compass indications of FIG. 1 provides a magnification of the compass card readout in the vicinity of lubber line 11, yet pictorial validity is preserved; that is, the relationship between the aircraft reference symbol 16 and the compass indication remains valid even though the scale factor of the compass card readout is constantly increased from the point diametrically opposite the lubber line to the top portion of the display. The concept then has the decided advantage of presenting to the observer a compass readout which would otherwise be obtainable only by the employment of a proportionally larger compass card diameter. In the example illustrated in FIG. 1, the scale factor enjoyed with a 6 inch diameter compass card is obtainable by use of a smaller 4.5 inch viewing circle and hence, the installation panel space requirement is accordingly reduced.

The rationale for the display as such having been discussed, further consideration will be concerned with the mechanization of the display concepts. The following description will center upon an electromechanical implementation of the instrument display, it being realized that the concept may be implemented by other means, such as for example by the incorporation of a cathode ray tube as the instrument face member and the electronic generation of appropriate symbols to realize the display.

The mechanization may be considered logically in three relatively independent areas: 1. a nonlinear compass ring, including moving indicia, numerals, and compass points N–E–S–W; 2. A course indicator with ends of the pointer lengthening and shortening upon rotation with respect to the instrument case; 3. Lateral and longitudinal deviation bars, plus "TO–FROM" arrow indication. These three areas will be discussed separately.

Figure 2:
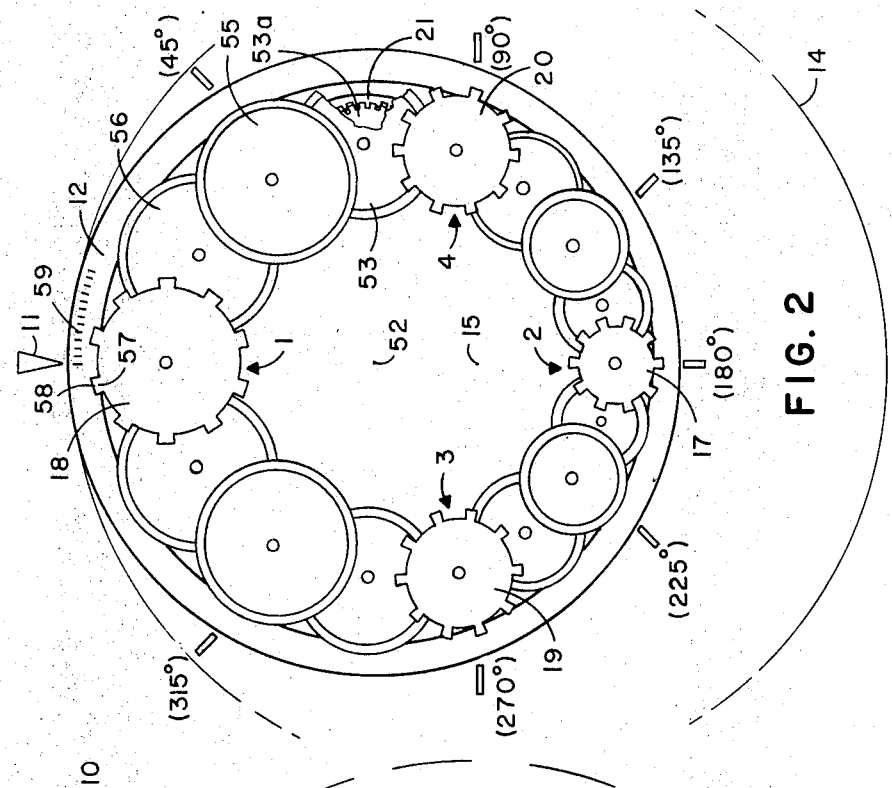
FIG. 2 is a functional mechanical arrangement of a manner in which the indicia bearing compass ring may be supported and driven in accordance with the principle of the present invention.

A compass ring implementation is illustrated in FIGS. 2 and 3. The magnification factor experienced in the vicinity of the lubber line 11 is determined by the ratio of the diameters of the viewing and phantom circles respectively. The scale factor variation may accordingly be embodied by a means of displacing compass ring index members and thereby continuously changing the scale factor from the bottom of the instrument to the lubber line location as a function of the ratio.

With reference to FIG. 1, in considering the respective 4.5 inch and 60 inch diameters of the viewing and phantom circles, it is noted that at the bottom of the indication, the distance from the phantom circle center 15 to the viewing circle is 1.5 inch, thus establishing a ratio of 3.0 to 1.5 or 2 to 1.

The embodiment to be described here is based on the concept of a compass ring member formed of a stretchable material. The "magnification" of the scale factor in the vicinity of the lubber line will then be achieved by controlling the stretch of the stretchable compass ring in a prescribed manner from the bottom of the ring to the top. FIG. 2 illustrates a method which might be employed to mechanically implement the desired geometry.

With reference to FIG. 2, the nonlinear compass ring 12 is embodied as a cylinder section of flexible material whose radius prior to stretching is equal to the distance between the center 15 of the phantom circle 14 and the bottom of the compass ring as viewed by the observer. The ratio of the phantom circle diameter to that of the unstretched ring is then 2 to 1.

With reference to FIG. 3, the inside surface of the ring 12 is formed with routed slots 58 which become wider and farther spaced in areas where the ring is stretched. The desired degree of stretch at all points around the ring 12 is maintained by a set of gears designed to mate with the ring such that tooth width and tooth spacing at the top of the ring are double those values at the bottom, with an appropriate progression at intermediate drive and idler points. The progression is defined as a proportional progression of stretch from unity at the 180° point on the viewing circle to "X" at the lubber line, where "X" is defined as the ratio of the phantom circle diameter to that of the unstretched belt and is equal to 2 in the instant example.

Referring then to FIG. 2, four such stretch and controlling and driving gears are indicated at the compass points N, E, S and W as defined by the projections of these compass points from the phantom circle 14 on the viewing circle. If bottom gear 17 be chosen to have an arbitrary tooth size mating with slots in unstretched belt 12, then top gear 18 is chosen to have twice the tooth width and spacing since we are indicating the full stretch factor of 2 at the top of the ring 12.

Gears 19 and 20 at the 270° and 90° compass points would then have tooth widths and spacing corresponding to that of the bottom gear 17 increased by one-half of the total increase from bottom to top. Thus, if the top gear 18 (as to tooth width and spacing) is defined as "unity", the bottom gear 17 would be defined as "one-half", and those at 90° and 270° would be defined as "three-fourths". Intermediate gears are indicated in phantom in FIG. 2, it being understood that each of the gears is defined as to tooth width and spacing on the basis of a proportion of total belt stretch from 180° to the lubber 11 on the viewing circle determined by the ratio $\theta/180°$ where $\theta$ is the viewing circle azimuth projection. The drive gears may actually overlap with alternate ones being essentially coplanar. Elongated coplanar in belt 12 could then facilitate a driving interface with all gears.

To control the stretch of the belt and likewise "rotate" the scale, means are employed to rotate all of the drive and stretch controlling gears at the same shaft speed. This feature may be embodied by employing equal-diameter pinions on each drive gear shaft, such as pinion 53a which is mounted with drive gear 53 on the same shaft. The pinion gears are all in turn rotated by means of an annular toothed belt 21 which mates with equal-diameter drive pinions on the drive gear shafts. The belt 21 might be backed with fiber glass fabric for example and may be driven in a conventional manner by a servo mechanism representing aircraft heading, the details of which will be further considered.

The compass card indicia and letters might be embodied as painted metal tabs 59 which mate in slots 60 formed in the viewing surface of the flexible ring 12 (See FIG. 3). The spacing of the individual tabs 59 would then become a function of the degree of stretch of the compass ring 12 at any given point around the ring. Toward the bottom sector of the ring, the 1° tabs might be so close together as to appear a solid white line, for example. In accordance, therefore, with the degree of stretch of the ring, the slots 60 would be located at 1° intervals as referenced to the phantom compass circle and initially at 1° intervals on the flexible ring prior to its installation. In this manner the indicia tabs under the control of the driving and stretch gears of FIG. 2, implement the scale magnification in the vicinity of lubber line. As further indicated in FIG. 3, the stretched ring might be retained in a trough 12, the inner surface of which be treated in a friction-reducing manner to permit a rotation of the stretched ring 12 within the confines of the trough member 12a as it is driven in accordance with aircraft heading. Mechanization of the course selector 13a, b, and c is such that it rotates with a change in aircraft heading and thus rotates with the compass ring. In conformance with established instrumentation, the course selector must also be driven independently of the presently experienced heading in order to select a desired course. As will be further described, this mechanization may be implemented in a conventional manner for horizontal situation indicators since the center of rotation of the course selector members 12a, b, c is at the center of the phantom circle 14; that is, at point 15 in FIG. 1. Thus, the structure that supports and rotates the course arrow, as well as the central deviation indication portion thereof, can be made to rotate linearly with change in aircraft heading, and can be rotated with respect to the compass or heading indication by incorporation of a mechanical differential drive mechanism.

The unique problem in mechanizing the course selector member is to permit the extremes of its "head" and "tail" segments to become longer and shorter as a function of the rotational angle of the member with respect to the lubber line 11. FIG. 5 illustrates an implementation which permits the adjustable length of the course selector head and tail extremes, such that they remain positioned adjacent the compass indicating indexes regardless of the angular position of the course selector member with respect to the compass indication, per se, Because of the displaced position of the center 15 of the phantom circle 14, the course selector mechanism cannot remain a fixed length and retain the desired readout ability. Referring then to FIG. 5, the course selector head and tail assemblies 13a and 13b might be formed of material which is flexible in one dimension, as for example beryllium copper, so as to extend and retract as a function of rotation angle with respect to the case. Accordingly, FIG. 5 illustrates an outer cylinder 24 constrained from rotation with respect to the instrument case. The outer cylinder 24 contains a groove 60 which retains cam follower members 61 and 62 associated respectively with the head and tail segments 13a and 13b of the course selector assembly. The head and tail assemblies 13a and 13b are accordingly carried by guide assemblies 63 and 64 mounted rigidly at diametrically opposite points on a rotatable inner cylinder member 25. Cylinder 25 is caused to rotate in accordance with aircraft heading and/or selected course. Guides 65 and 66 might be employed to align the members planar the desired planar relationship as they are extended and retracted. Relative rotation between cylinder fixed outer cylinder 24 and the inner cylinder 25 imposes a camming action between the cam follower members 61 and 62 as they cooperate between the camming slot 60 to foreshorten the arrow end of the course indicator while lengthening the tail end, and vice versa.

The center portion 13c of the course arrow assembly is seen to be of a fixed length and may be displaced transverse of the axis of the course selector assembly by a meter movement 23, carried within and affixed to the inner cylinder 25. Further, a deviation bar 72 may be displaced transverse of the course selector center portion movement by means of a second meter movement 67, carried within and affixed to, the cylinder 25. A still further indicator 43 in the form of an arrowlike member may be rotated by a meter movement 67, carried within and affixed to, the cylinder 25 so as to be rotated selectively 180° to indicate that the selected course defined by the position of the course selector assembly is "to" or "from" a selected navigation ground station. The assembly then is seen to permit the course selector assembly 13a, b, c to adjust to proper length as a function of relative rotation with respect to the compass indicating ring, and permits the deviation and "-TO–FROM" indicia to maintain the desired relationships with the course selector assembly regardless of the particular course selected.

Figure 4:
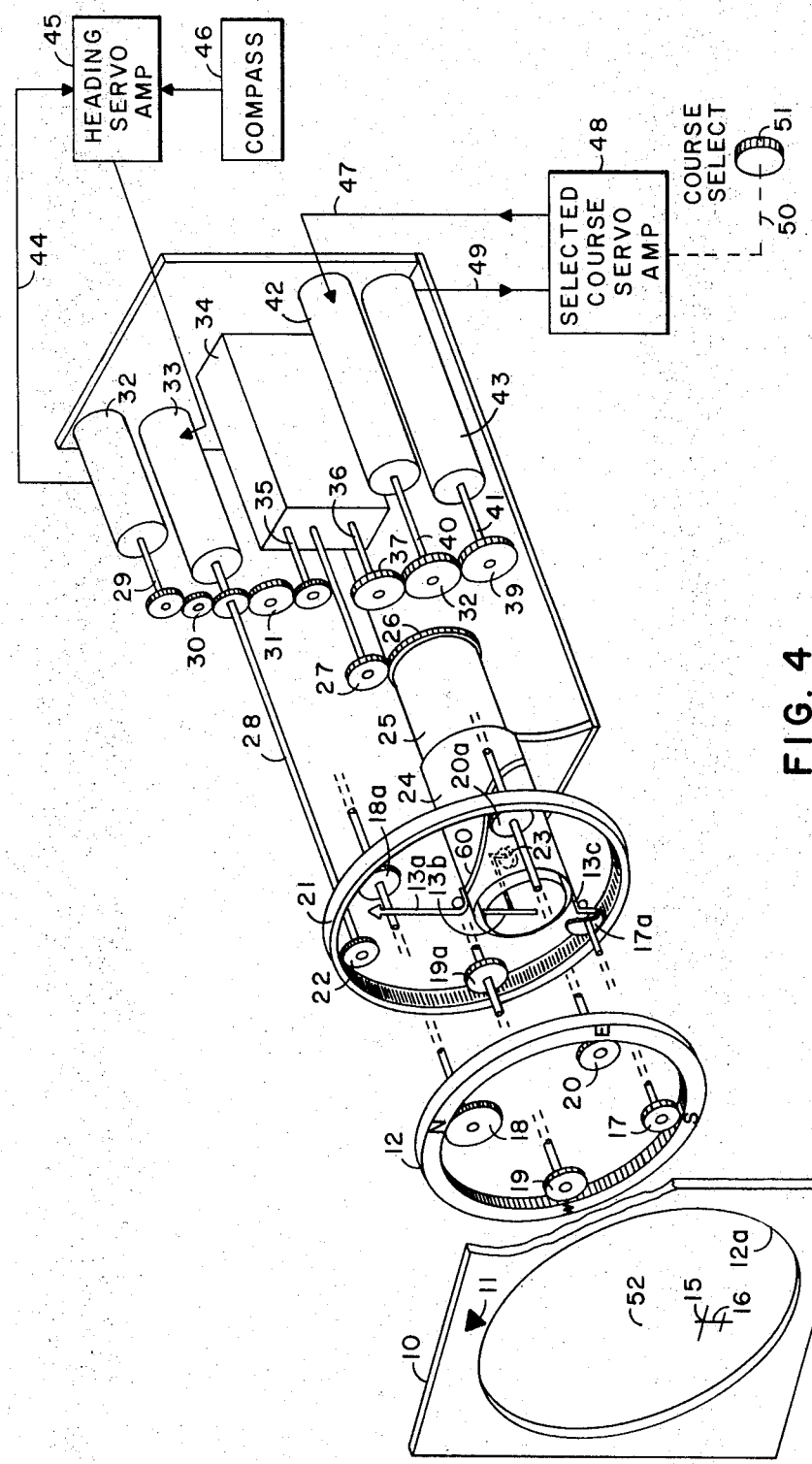
FIG. 4 is a functional and mechanical representation of an instrument assembly in accordance with the present invention.

FIG. 4 represents a mechanical assembly of an instrument in accordance with the present invention showing the combined relationship of the course selector assembly, the flexible nonlinear compass ring 12, and the reference indicia, lubber line 11, and fixed aircraft reference symbol 16. FIG. 4 further illustrates the functional incorporation of servo systems to effect the necessary drives and their tie-in with external computing functions. The phantom circle center 15, which defines the location of the aircraft reference symbol 16, defines the common longitudinal axis of the cylinder members 24 and 25 which comprise the course selector drive assembly. Outer cylinder 24 is fixed to the instrument case while inner cylinder 25, by means of a ring gear member 26, is positionable through the output drive gear 27 of a mechanical differential 34. Inputs to the mechanical differential 34 are respectively aircraft heading and selected aircraft course. Aircraft heading is imparted as an input to the mechanical differential 34 by means of a drive arrangement between the output shaft 28 of the heading servomotor 33, idler gear 31, and first input shaft 35 of the mechanical differential. Selected course input to the mechanical differential is imparted through a course servomotor output shaft 40, gear drive 38–37, and second input shaft 36 to the mechanical differential. The output of the mechanical differential is the sum of the heading and selected course inputs and is imparted to drive the inner cylinder 26 of the course selector assembly through drive gear 27. The inner cylinder 25 is thus positioned continuously in accordance with aircraft heading changes and selectively by a fixed differential amount in accordance with a particular selected course input.

The heading servomotor 33 is driven by the output of an associated heading servo amplifier 45 which receives an input from a compass 46, the servo loop being completed by the inclusion of a heading synchro 32 which is driven in accordance with the rotation of servomotor 33 to provide a position feedback 44 to the heading servo amplifier 45. Likewise, the selected course input is effected by positioning a course servomotor 42 in accordance with an output 47 from a selected course servo amplifier 48. The selected course is imparted into the amplifier 48 by rotation of a course selector knob 51. The look is completed by the incorporation of course synchro 43 to provide a position feedback signal 49 to the course servo amplifier 48.

The rotation of the stretchable compass ring member 12 is illustrated by the driving relationship with the heading servomotor 33 as imparted through shaft 28 and drive gear 22 to a flexible drive belt 21 which in turn drives like-diameter pinions, each associated with the one of the variable diameter drive and stretch defining gears which cooperate with, and position, the flexible compass ring member 12.

Although the present invention has been described with respect to a particular embodiment thereof, it is not to be so limited as changes might be made therein which fall within the scope of the invention as defined in the appended claims.

I claim:

1. In an aircraft instrument of the type comprising a rotatable annular scale upon which indicia depicting like angular increments with respect to a centrally located reference index are peripherally placed, a lubber reference line affixed adjacent said annular scale at the top thereof; means for displaying those of said equal angular increments adjacent said lubber line reference index with a predetermined enlarged scale factor as compared to those diametrically opposite said lubber line and with a continuously diminished scale factor over the semicircular portions of said scale either side of that portion adjacent to said lubber line; comprising means for displacing each angular increment indicia at a position on said annular scale periphery corresponding to the respective projections on said scale of angle defining radii of a second circle the center of which lies a predetermined distance beneath that of the annular scale and of a predetermined larger radius equal to the distance between the displaced center thereof and the point on the periphery of said annular scale adjacent said lubber reference line, said reference index being affixed at the center of said second circle, whereby the projections of the four points of a compass on said larger circle lie on mutually perpendicular axes passing through the center of said second circle.

2. An aircraft instrument as defined in claim 1 further comprising a second pointerlike indicator lying in a plane parallel to that of said annular scale and rotatable about about axis transverse said plane and passing through the center of said phantom circle, means for rotating said second indicia with respect to said annular scale, means for selectively adjusting the length of first and second ends of second indicia as a function of the rotation of said indicia whereby the ends thereof maintain a predetermined space relationship with respect to said annular scale upon relative rotation between second indicia and said lubber line reference index.

3. An aircraft instrument as defined in claim 2 wherein said annular scale is rotatable with respect to said lubber line reference index heading as a function of the heading of said aircraft, said second indicia being rotatable about said phantom circle axis in accordance with aircraft heading and being independently adjustable with respect to said aircraft heading by selectively activated positioning means corresponding to a desired aircraft angular course to be flown.

4. An aircraft instrument as defined in claim 3 wherein said second indicia comprises a first head end portion, a second tail end portion, and a third intermediate body portion, the head and tail end portions being adjustable in length, means for varying the respective lengths thereof as a function of the angular relationship between said second indicia and said lubber line index.

5. An aircraft instrument as defined in claim 4 whereby the means for adjusting the lengths of the head and tail ends of said second indicia comprise means for simultaneously effecting simultaneous and oppositely directed length adjustments of the respective ends thereof.

6. An aircraft instrument as defined in claim 5 wherein said central portion of said second indicia is transversely displaceable with respect to the longitudinal axis of said second indicia, and means for displacing said central portion as a function of the aircraft displacement from a selected course line as defined by the angular position of said second indicia.

7. An aircraft instrument as defined in claim 6 wherein said annular scale comprises a cylindrical section of stretchable material having an unstretched radius equal to the distance between said phantom circle center and the point on said annular scale diameter opposite said lubber line reference index, a plurality of drive gears disposed circumferentially about the inside diameter of said cylindrical section, each of said drive gears comprising gear teeth in cooperative engagement with conforming slots formed on the inside surface of said cylindrical section, said plurality of drive gears including a first drive gear engaging said cylindrical section at a point radially inward from said lubber line reference index, and a second drive gear in cooperative engagement at a point diametrically opposite that of said first drive gear, said second gear comprising a like number of gear teeth the spacing between and tooth widths of which are related to that of said first drive gear by a ratio relationship defined as the ratio of said phantom circle diameter to the unstretched diameter of said cylindrical section, intermediate ones of said drive gears rotating about axes lying on selected ones of radials intermediate said first and second drive gears and having gear tooth spacing and tooth width configurations proportioned between those of said first and second drive like-diameter and means for rotating said drive gears at the same angular rate as a function of the heading on said aircraft.

8. An aircraft instrument as defined in claim 7 wherein the means for rotating said drive gears comprises like-diameter drive pinion gears mounted on the shafts on each of said drive gears, is annular internally threaded belt in driving engagement with each of said pinions, and means for driving said belt as a function of changing aircraft heading.

UNITED STATES PATENT OFFICE
CERTIFICATE OF CORRECTION

Patent No. 3,538,881                    Dated November 10, 1970

Inventor(s) Charles A. Fenwick

It is certified that error appears in the above-identified patent and that said Letters Patent are hereby corrected as shown below:

Column 3, line 51, "60" should read -- 6 --. Column 4, line 28, "coplanar" should read -- slots --. Column 5, line 29, "planar" should read -- in --; line 30, "cylinder" should read -- the --. Column 6, line 60, "indicator" should read -- movable indicia --; line 61, "about", second occurrence, should read -- an --. Column 8, line 17, "like-diameter" should read -- gears, --; line 23, "is" should read -- an --.

Signed and sealed this 27th day of April 1971.

(SEAL)
Attest:

EDWARD M. FLETCHER, JR.                    WILLIAM E. SCHUYLER, JR.
Attesting Officer                          Commissioner of Patents